Patented Oct. 31, 1922.

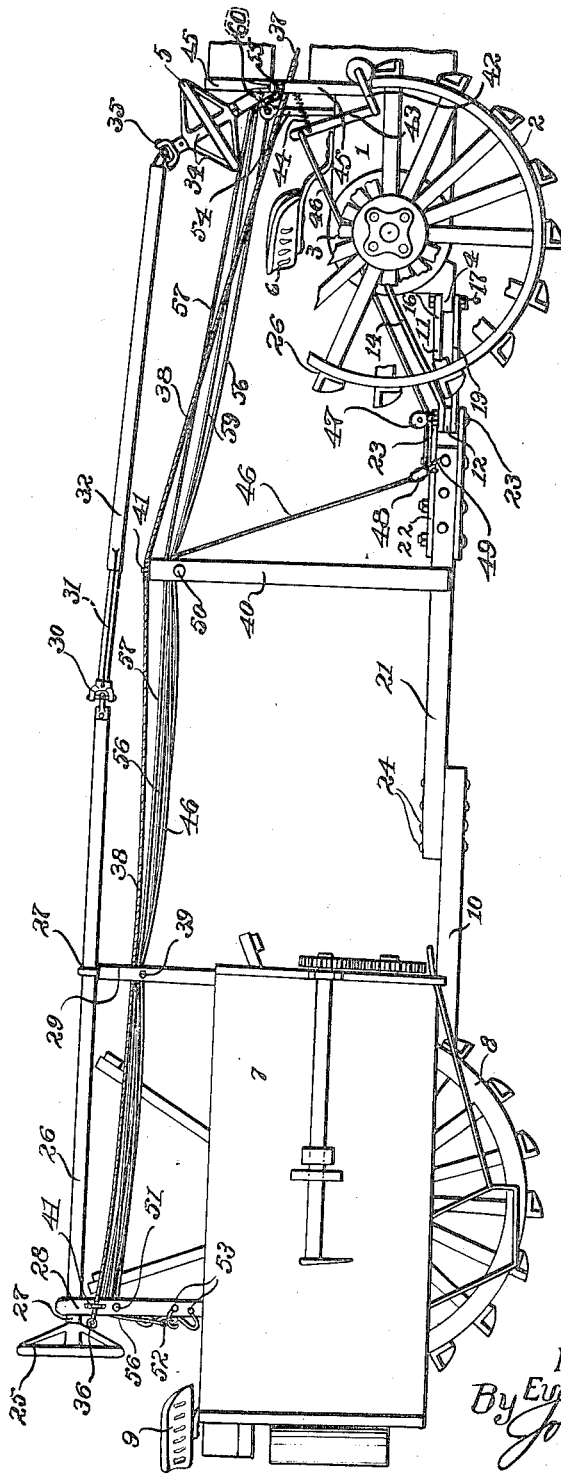

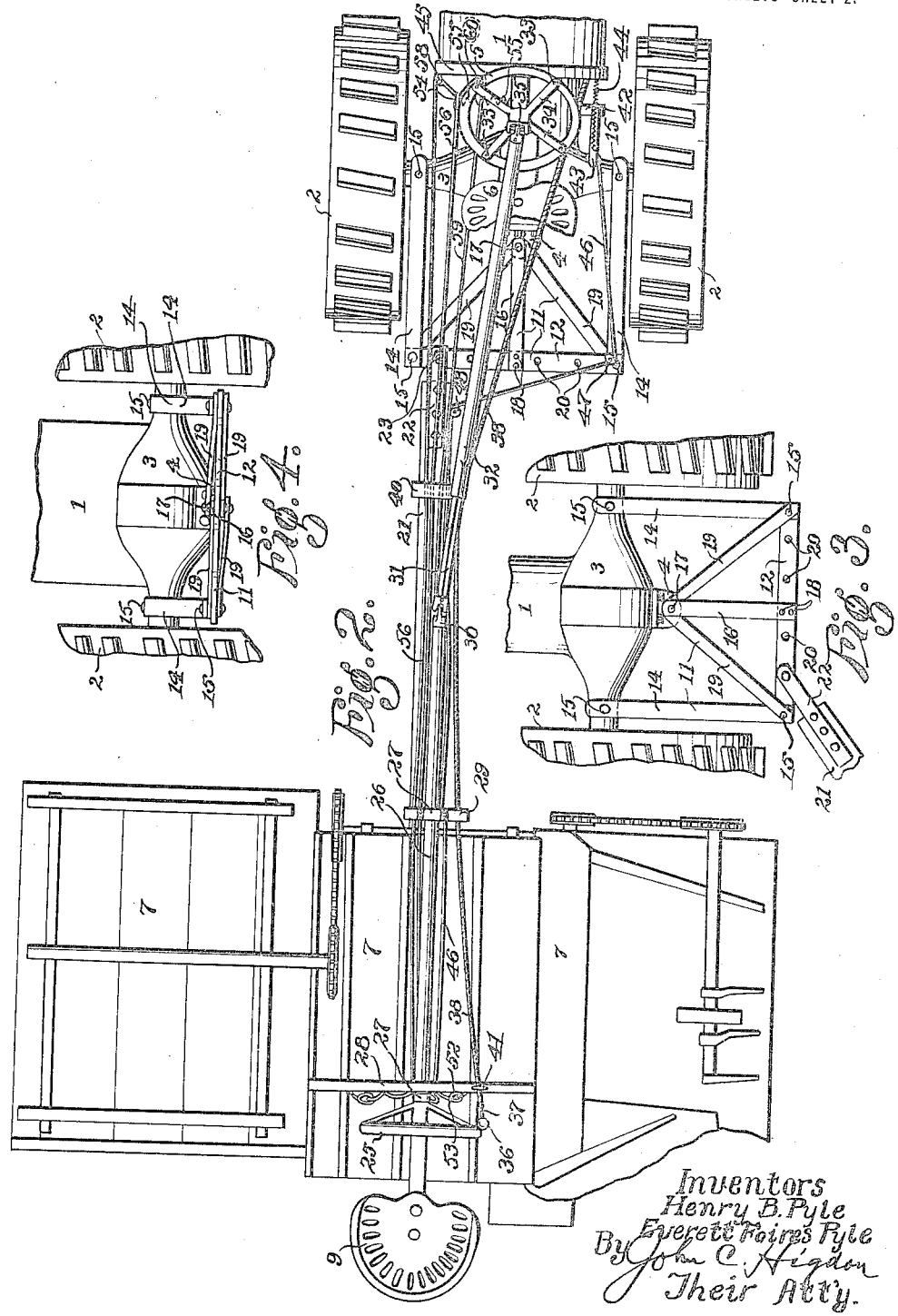

1,433,742

UNITED STATES PATENT OFFICE.

HENRY B. PYLE AND EVERETT F. PYLE, OF ST. JACOB, ILLINOIS.

EXTENSION TRACTOR CONTROL.

Application filed October 9, 1920. Serial No. 415,784.

*To all whom it may concern:*

Be it known that we, HENRY B. PYLE and EVERETT F. PYLE, citizens of the United States, residing at St. Jacob, in the county of Madison and State of Illinois, have invented certain new and useful Improvements in Extension Tractor Controls, of which the following is a specification containing a full, clear, and exact description, reference being had to the accompanying drawings, forming a part thereof.

Our invention consists in the novel construction and combination of parts hereinafter particularly described and distinctly claimed.

The object of our invention is to provide an improved extension control for tractors, which shall be simple in construction, of low cost, and highly efficient in operation, when used in connection with any of the tractors, binders and other common farm implements now on the market.

In the drawings,

Fig. 1 is a side-elevation of the important parts of a binder and a tractor, having our invention applied thereto.

Fig. 2 is a top plan-view of the same.

Fig. 3 is a detail fragmentary plan-view of the rear end of a tractor, showing the construction and function of our improved hitch-mechanism, and Fig. 4 is a rear elevation of the same.

The numeral 1 designates the tractor, having the usual traction-wheels 2, rear-axle housing 3, draw-bar or hitch connection 4, engine or motor, carbureter, change-speed gear, clutch, and all the customary operating devices, as well as a steering-wheel 5, and a driver's seat 6.

The numeral 7 designates a binder or other common farming-implement, which is to be hauled by said tractor.

In the implement herein shown (which is an ordinary grain-binder), the same has the usual traction-wheels 8, driver's seat 9, stub-tongue 10, and all other customary operating devices.

A strong rectangular hitch-frame 11 has a horizontal hitch-bar 12 connected to the said tractor housing 3 at each end by upwardly inclined braces 14, by means of which an upward pull will be exerted upon said hitch-bar, and upon any implement or other thing to which said horizontal hitch-bar may be connected.

Bolts or rivets 15 connect the front ends of the said inclined braces 14 to the top side of said tractor housing 3, and similar fastenings are applied to the rear ends of said braces, to connect same to the adjacent ends of the said horizontal hitch-bar 12.

A draw-bar extension 16 connects the draw-bar 4 of the tractor to the said horizontal hitch-bar 12, at the center of the length of the latter, a common coupling-pin 17 being used at the front end of said hitch-bar, and the rear end of the same being secured to said hitch-bar by common bolts or rivets 18, as shown more clearly in Fig. 3.

A pair of horizontal braces 19 are arranged in triangular or V-shaped relation, and extend rearwardly from said coupling-pin 17 of the tractor draw-bar, to which the forward ends of said braces are secured by said coupling-pin, and the rear ends of said braces are connected to the outer ends of said hitch-bar 12, as well as to the rear ends of the said inclined braces 14.

By the construction just described, it will be seen that the said tractor hitch-frame 11 is very rigid, strong and durable.

A series of hitch-holes 20 are formed in the said horizontal hitch-bar 12 at various points in the length thereof, so that the front end of the tongue 21 of the binder or other implement may be hitched to said hitch-bar at the point in the length of the latter which will be most advantageous.

The tongue 21 of the implement to be drawn by said tractor 1, is provided with the usual hitch-irons 22, which are pivotally connected to the said hitch-bar 12 by means of a suitable bolt or pin 23, passing through apertures in said irons and through one of the series of said apertures or hitch-holes 20 of the hitch-bar.

When most of the turns in a field have to be made to the left, the said bolt or pin 23 is located in the hitch-hole 20 which is farthest from the center of the length of said hitch-bar 12, at the left-hand end thereof, as shown in Fig. 3; and if few turns are to be made the tongue is hitched to said hitch-bar near the center of the length of the latter.

In case the turns are mostly to be made to the right, the tongue 21 should be connected to the right-hand end of said hitch-bar.

In the present arrangement, as shown in Fig. 1, the tongue 21 is connected by bolts 24 to the front end of the stub-tongue 10 of the said binder 7.

*The extension steering mechanism.*

The tractor 1 is steered from the binder 7, by an extension steering-wheel 25 that is mounted in front of the binder driver's seat 9, upon the rear end of a horizontal steering-rod 26, which is mounted to revolve in bearings 27 in the top of two binder-stands 28 and 29.

These binder-stands are suported by the binder, and the rear stand 28 is located convenient to the said driver's seat 9, while the said stand 29 is located some distance in front of said rear stand, at a point near the front of the binder or other implement, so that said horizontal steering-rod 26, and other extension controlling connections for the tractor, will be supported in a horizontal position by said binder or other implement.

At the front end of the said horizontal steering-rod 26 is a universal-joint 30, which connects said rod to the rear end of a squared (or non-circular) telescopic section 31 that is mounted to slide in and out of a front tubular-extension 32 having a squared (or non-circular) rear end in which said squared telescopic section 31 is mounted.

The steering-wheel 5 of the tractor has fixed upon it by means of small bolts or rivets 33 a common inverted steering-wheel spider 34, Fig. 1, which carries a common swivel or universal joint 35 that connects the front end of said front tubular-extension rod 32 to the said spider.

By the construction just described, the driver occupying the driver's seat 25 upon the distant binder (or other implement) can readily steer the tractor in any desired direction, inasmuch as the said two universal-joints 30 and 35 permit the turning of the tractor steering-wheel in either direction, even though the relative angles assumed by the horizontal extension-rod 26, the tubular extension rod 32, and the steering-post of the tractor, be changed in turning corners and passing over uneven ground.

At the same time, the said telescopic squared section 31 of the steering rod extension, works easily in and out of the squared end of said front tubular-extension 32, and permits the driver on the binder or other implement to control the steering-wheel of the tractor upon rough ground, as well as in making turns.

A throttle-valve controlling-handle 36, is carried at the rear end of a common sliding-wire 37, which should be connected at its front end to the throttle-valve of the tractor, in the usual manner or to a common governor, so that the driver may control the said valve from the implement being hauled by said tractor, said handle being located convenient to the binder steering-wheel 25.

Said sliding-wire 37 is mounted to slide in the usual flexible covering or cable 38, which extends over, and is supported by a horizontal bar 39 carried by the said front binder-stand 29, thence over the top of a supporting-stand 40 carried by said implement tongue 21, and thence to the tractor.

Common fastening-devices 41 are used to secure said flexible cable 38 to the stands, 28 and 40.

For controlling the tractor clutch, in starting and stopping the tractor, we provide the clutch-pedal 42 with an upwardly-extending lever 43, which is normally drawn into a clutching-position by a coiled spring 44 secured at one end to said lever and fixed at its opposite end to some part of the tractor hood, dash or cowl 45.

To throw out the clutch, the said lever 43 is drawn backward at its upper end by a flexible wire, rope or cord 46, secured to the upper end of said lever and extending backwardly and downwardly to and around a pulley 47 that is mounted on the right-hand rear corner of the said tractor hitch-frame 11; thence inwardly toward the tongue 21 and under another pulley 48 secured by suitable fastening-devices 49 to said tongue; thence upwardly to and over a horizontal bar 50 extending across the said tongue-stand 40, near the top of said stand; thence rearwardly to the front binder-stand 29, whereon said cord is supported by the previously mentioned horizontal-bar 39; and finally to and over a horizontal bar or rod 51 on the said rear binder-stand 28, where said cord or rope is provided with a common hook or ring 52, that may be made to engage a pin or hook 53 on said stand, to hold said clutch-lever 43 in a clutch-disengaging position, when desired.

The gear-shift lever 54 of the tractor, is controlled by three separate ropes, cords or flexible wires, all similar to the said flexible device 46, just above described for controlling the said tractor clutch-lever.

Said gear-shift lever 54 is normally drawn to one side at its upper end, by a coiled spring 55 secured at one end to said lever, and fastened at its opposite end to the tractor steering-post or other part of said tractor; and when said lever is in either side position all gears will be in neutral position.

Said spring 55 holds said lever 54 in neutral position.

To change the gears, to second speed, or to reverse a rope or cord 56 is attached to the upper part of said lever 54, and extended back in a straight line to and over said horizontal bar 50 of the said tongue-stand 40; thence to and over the said horizontal bar 39 of said front binder-stand 29; and thence to and over the said horizontal bar 51 of the rear binder-stand 28, where said rope or cord is provided with a common hook or ring 52 that may be made to engage a pin 53 on said last-mentioned stand, to hold said gear-shift lever in the position desired.

To pull said gear-shift lever 54 to the opposite side of the gear-shift sector (not shown), against the power of said spring 55, in changing gears to low or second speed, ropes or cords, and pulleys are provided, as will now be described in detail.

To pull said lever 54 to the left, against said spring, a left rope or cord 57 is connected to the upper part of said lever, and thence is led to the left around a pulley 58 mounted on the said tractor dash 45; thence rearwardly over the said horizontal bars of said three stands previously described; and finally to a point convenient to the said driver's seat 9 on the binder or other implement, where said rope or cord is provided with a hook or ring 52, to engage a pin or other fastening-device 53 on the rear binder-stand 28.

Said spring 55 pulls said lever 54 to the right, through the neutral notch of the sector, in changing gears.

Another rope or cord 59 is connected to the upper part of said lever 54, and thence passes forward to and around a pulley 60; thence rearwardly, over the said horizontal bars of the three stands previously described, to the rear of the rear binder stand 28, and it is there provided with a hook or ring 52 adjacent the driver's seat on the binder or implement that is being drawn by said tractor.

By manipulating the said three ropes or cords 56, 57, and 59, the said gear-shift lever 54 may be operated to shift the gears, as may be required, from the driver's seat on the implement that is being hauled by said tractor.

The operation of our invention will be clear from the above description.

The following is what we claim as our invention:—

An improved extension tractor-control, comprising a rectangular hitch-frame secured to the rear-axle housing of the tractor; and having a horizontal bar in which are formed a series of hitch-holes; an implement to be hauled by the tractor; a tongue for the implement to be hauled; a vertical supporting-stand mounted on said tongue, near the forward end thereof; a horizontal-bar near the top of said stand; a plurality of additional supporting-stands arranged upon the implement to be hauled; horizontal-bars carried by said additional supporting-stands; an extension steering-rod extending from the steering-wheel of the tractor to a point near the driver's seat on said implement to be hauled and thereat provided with a steering-wheel; flexible members extending rearwardly directly from the tractor controlling-devices to the said vertical supporting-stands, and thence to the driver's seat on said implement to be hauled; and a clutch-pulling flexible member that is passed downwardly from the said horizontal-bar on said tongue-supported stand, to and under a pulley carried by said tongue, thence outwardly to a pulley that is mounted on the right-hand rear corner of the said hitch-frame, and thence to the clutch-lever of said tractor, the forward end of said clutch-pulling flexible member being secured to the said clutch-lever.

In testimony whereof we have hereunto signed our names in the presence of two subscribing witnesses.

HENRY B. PYLE.
EVERETT F. PYLE.

Witnesses:
FRANK PIKE,
LEROY ROGIER.